United States Patent [19]
Treat, Jr.

[11] Patent Number: 5,290,055
[45] Date of Patent: Mar. 1, 1994

[54] WHEELCHAIR PUSH BAR AND METHOD

[76] Inventor: Merritt W. Treat, Jr., P.O. Box 781, Chatham, Mass. 02633

[21] Appl. No.: 958,643

[22] Filed: Oct. 7, 1992

[51] Int. Cl.$^5$ .............................................. B62J 27/00
[52] U.S. Cl. ............................ 280/304.1; 280/47.371; 16/114 R
[58] Field of Search .................... 16/114 R, 111 R; 280/47.371, 304.1, 304.3, 304.4

[56] References Cited

U.S. PATENT DOCUMENTS

| | | |
|---|---|---|
| 4,127,915 | 12/1978 | Logan et al. |
| 4,386,790 | 6/1983 | Kassai |
| 4,708,357 | 11/1987 | Soderbaum |
| 4,872,697 | 10/1989 | Berkowitz |
| 4,964,648 | 10/1990 | Berkowitz |
| 5,044,650 | 9/1991 | Eberle, Jr. |

Primary Examiner—Mitchell J. Hill
Attorney, Agent, or Firm—Thomas A. Kahrl

[57] ABSTRACT

A push bar apparatus for use with a collapsible wheelchair adapted for quick disconnect and engagement with a plurality of sizes hand grips of wheelchairs to permit one handed pushing of the wheelchair by an attendant, leaving the other hand free. The push bar has an elongated bar with hollow sleeve adapters at opposite ends, having positive locking devices adapted to engagably receive the pair of grip handles in spatial relationship extending rearwardly in a horizontal plane from the back of a collapsible wheelchair. The push bar device eliminates the need to twist a user's wrists thereby making pushing the heavy weight of patient in wheelchair much easier; a particular advantage to an elderly attendant.

12 Claims, 3 Drawing Sheets

Fig_1

WHEELCHAIR PUSH BAR AND METHOD

BACKGROUND OF THE INVENTION

Handicapped persons, particularly those using wheelchairs, have been afforded substantially increased access and mobility as a result of the passage of The Americans With Disability Act, which requires access to be provided to public buildings. Often the enhanced mobility provided to wheelchair users requires the assistance of an attending "Care giver," such as a spouse or family member, for propelling and directing the wheelchair occupied by the patient, such as in shopping in a supermarket. In order to achieve greater mobility, wheelchairs now commonly in use are of collapsible construction, adapted for movement between an open or occupied position and a closed, flat position for transport in a vehicle, particularly the trunk of a car or alternatively, for storage in a closet. The collapsible construction of such chairs precludes a cross bar handle for pushing, such as is common with shopping carts, rather rearwardly extending handles are provided for pushing the wheelchairs by an attendant which do not provide ease of use, and require the use of both hands.

In order to fold flat, the handles, being formed integrally with the tubular frame of the wheelchair and typically having grips, are currently constructed to extend rearwardly in the same plane as the wheelchair's side frame panel. When the wheelchair is in the open/occupied position, the hand grip handles extend rearwardly in a plane parallel with the side panels, such that, in order for an attendant to grip the hand grips for propulsion, it is necessary to twist his or her wrist approximately 90° forward from the normal gripping position, whereby the attendant's knuckles are in alignment with the rearwardly extending hand grip handle, placing a strain on the attendant's wrist, thereby weakening it. Also, as currently designed, wheelchairs must be operated by the use of both handles due to the weight of the patient, and the poor leverage provided by the rearwardly extending hand grip handles. Inasmuch as both handles are required by the attendant to operate the wheelchair, it is very difficult to operate the wheelchair and open doors or do grocery shopping with an associated shopping cart or, in a hospital situation to push an accessory piece of equipment while propelling the patient.

In the past, wheelchair hand grip construction has not received attention because historically these chairs were operated by hospital orderlies, or were intended for limited movement about a dwelling where the wheelchair is attended by a member of the family. More recently, prior art devices have attempted to provide improved mobility with devices which are adapted for one-handed operation. For example, a raised adapter handle has been developed for use on wheeled vehicles having two spaced-apart handles and a single hand grip extending from the center of the adapter handle. This adapter handle is disclosed and claimed in U.S. Pat. No. 4,708,357, issued on Nov. 24, 1987 to Mavis Soderbaum, which Letters Patent have been assigned to the Gerard Berkowitz. Whereas the Soderbaum adapter handle provides a single handle between two handle grips, it has failed to re-orient the single handle such that it remains difficult to apply propulsion and steering forces to the wheeled vehicle with the single, rearwardly extending handle. Furthermore, the Soderbaum handle is not easily removable to permit use on a plurality of wheeled vehicles, as is required in a hospital setting where an attendant is called upon to serve a large number of wheelchair patients on a given day. Another prior art adapter handle, adapted for use with two spaced-apart handles, is disclosed and claimed in U.S. Pat. No. 4,872,697, issued on Oct. 10, 1989 to Gerard Berkowitz. The Berkowitz adapter handle suffers from the same deficiencies as the Soderbaum in that it fails to re-orient the unitary handle used to apply propulsion forces and for steering, rather it also extends rearwardly and remains difficult to operate, particularly where heavy loads are involved as is with a wheelchair patient in a thick pile carpet environment such as a retirement home. Furthermore, Berkowitz uses clamps which permit removal, but does not permit quick removal, and involves complex apparatus. Berkowitz is adapted to accommodate a plurality of sized handles, but requires complex clamping mechanisms for such an accommodation.

Another adapter handle has been developed which extends between the hand grips of a wheelchair to permit an attendant to maneuver it with one hand by utilizing a raised hand grip cross bar. This particular wheelchair handle is disclosed and claimed in U.S. Pat. No. 5,044,650, issued on Sep. 3, 1991 to Robert Eberle, Jr. The Eberle wheelchair handle provides a raised cross bar extending above and between handles on the wheelchair. In order to connect the Eberle handle it is necessary that the ends of the synthetic rubber handle grips be removed by cutting on given a wheelchair to provide openings. These openings give a number and page and line reference and are required to accept pins to extend in the open ends of the handles, being held in place by friction alone. Eberle has the further difficulty that there is no positive locking device to keep the raised cross bar in engagement with the handles at such time as the wheelchair is being wheeled down a decline. Without a locking device, there is a risk that an attendant, upon attempting to restrain forward movement of the wheelchair, is apt to pull the raised cross bar free from the wheelchair, losing control thereof.

Also, whereas orderlies were historically used to assist wheelchair patients in hospital settings, it is now common for volunteer "Care Givers", typically retired persons, to perform this task. Normally an on-duty care giver is called upon to assist a large number of wheelchair patients, with relatively short notice, and as a rule, each has their own collapsible wheelchair which may vary slightly in construction, particularly with respect to handle grips. Furthermore, it is common for wheelchair patients to be undergoing continuing treatment in a hospital, such as receiving intravenous treatment, and thus are connected by tubing apparatus to medical equipment installed on an accessory wheeled vehicle called a "quest infuser". In order to push both the wheelchair and such accessory equipment, the care giver must push the wheelchair with one hand, attend to the quest infuser with the other and deal with opening and closing doors as appropriate.

It is henceforth desirable to provide for a new and improved adjustable push bar apparatus for connecting hand grips of a collapsible wheelchair, whereby the wheelchair may be easily operated by an attendant with one hand and which provides protection against accidental loss of control to provide for quick connection and disconnects with a plurality of sizes of wheel chairs and to overcome at least some of the disadvantages of the prior art adapter handle devices.

SUMMARY OF THE INVENTION

This invention relates to a wheelchair push bar apparatus for a quick connect and disconnect to grip handles of a collapsible wheelchair, and to a method of pushing wheelchairs employing the push bar apparatus. A simple, inexpensive and portable quick disconnect push bar apparatus has been discovered for centrally connecting handle grips of a collapsible wheelchair in a much easier manner which places less strain on the wrists of a wheelchair attendant.

In the preferred embodiment, the push bar apparatus comprises an elongated push bar of substantially U-shaped configuration, having a tubular central portion and a pair of sleeves, each positioned at opposite ends of said push bar. In particular, the sleeves comprise a first and second sleeve of hollow configuration, adapted to extend over the handle grips, typically constructed of synthetic rubber or plastic, fastened by shrink fit or adhesive material on handle extensions positioned on the back of a wheelchair. The sleeves are cantilevered and extend outwardly at opposite ends of the central tubular portion in spatial relationship for laterally connecting the hand grips of the wheelchair, wherein the push bar is positioned in line with the hand grips.

Conventional wheelchairs, well known in the art, typically consist of a body portion, large back wheels for propulsion and smaller front wheels for balance, said wheels being fastened to the body portion of the wheelchair, and the body portion also including side supports with a seat portion positioned between the side supports, and a back portion between upper supports the body portion being foldable when the wheelchair is changed form a using position to a transporting position. In order to accommodate the foldable feature of the body portion, the handles extend rearwardly from the upper supports. Being so positioned, the pair of handles, when in the transporting position, extend rearwardly in a spaced-apart relationship due to the fact that the upper supports are normally spaced apart.

In the preferred embodiment, the pair of sleeves are adapted for quick engagement and disengagement with the pair of handle grips and associated handle frames, being outwardly cantilevered at the opposite ends of said central portion in spaced apart relationship for laterally connecting the hand grips of the wheelchair. Each sleeve is configured to terminate in a hollow end, having an interior diameter ("I.D.") of 1 and ⅞" and are equipped with an elongated hollow sleeve member characterized by an elongated hollow cross section adapted for quick engagement and disengagement with the handle grip and having sufficient clearance to accommodate a plurality of sizes of handle grips on a plurality of wheelchair designs. Each sleeve includes a locking apparatus, typically a knob and threaded shaft, providing a positive locking engagement with the handle grips and handle frames for preventing accidental disengagement of the push bar apparatus from the wheelchair resulting in loss of control thereof. The locking apparatus is located adjacent the open end of an associated elongated hollow sleeve and comprises a knob device having a threaded shaft extending in perpendicular relation ship to th longitudinal axis of said hollow sleeve having a terminal end adapted to compress the handle between said end and th opposite wall of the hollow sleeve.

In an alternate embodiment, the hollow sleeve extends over an associated grip handle to position the threaded shaft immediately inwardly and adjacent the forward edge of the handle grip, extending in perpendicular relation ship to the longitudinal axis of said hollow sleeve having a terminal end. The terminal end is adapted to compress the handle frame between said end and the opposite wall of the hollow sleeve for positive locking engagement. The a pair of elongated hollow sleeves are configured to accept an associated one of said handle grips into and along the interior of the hollow sleeve. The elongated hollow sleeves are characterized by a generally circular cross-section for extending over and along the hand grips adapted for quick detachable engagement with a plurality of sizes of wheelchair grip handles, and are positioned to normally bias the pair of grip handles outwardly away from each other. In this embodiment the sleeves are of extended length so as to project forwardly over and beyond the end of the rubber grip portion of the grip handles to permit the threaded shaft of the locking apparatus to engage the tubular frame, whereby the tip of the locking means abuts the inner end of the associated rubber grip providing positive locking.

In a further embodiment of the invention, the push bar apparatus includes a central tubular portion having an adjustment device for providing longitudinal adjustment adapted to differing spatial arrangement of the grip handles of differing wheelchair construction.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DETAILED DESCRIPTION OF THE PREFERRED EMBODIMENT

Figure 1:
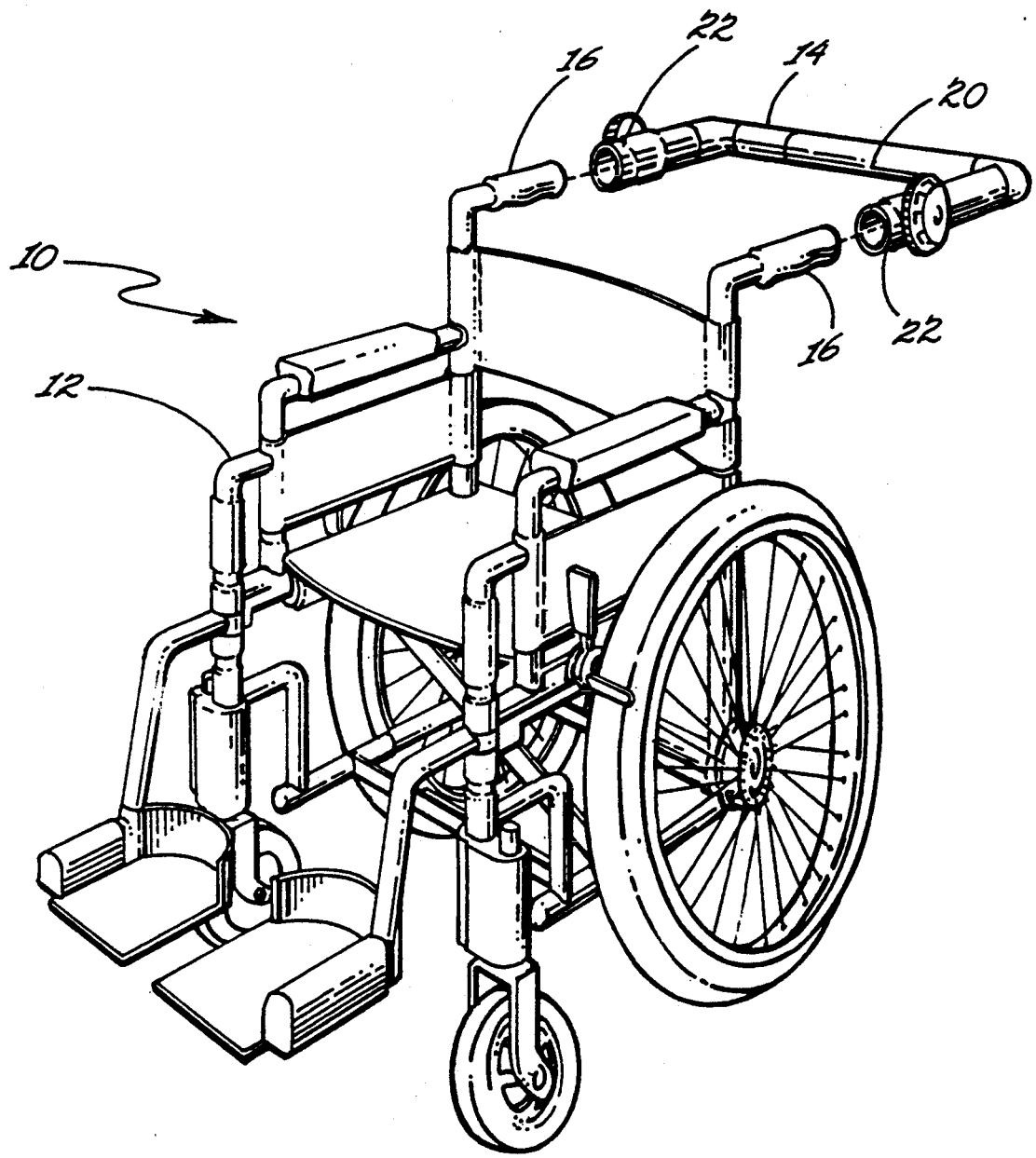
FIG. 1 is a perspective view of the push bar of the present invention in combination with a collapsible wheelchair.
Figure 2:
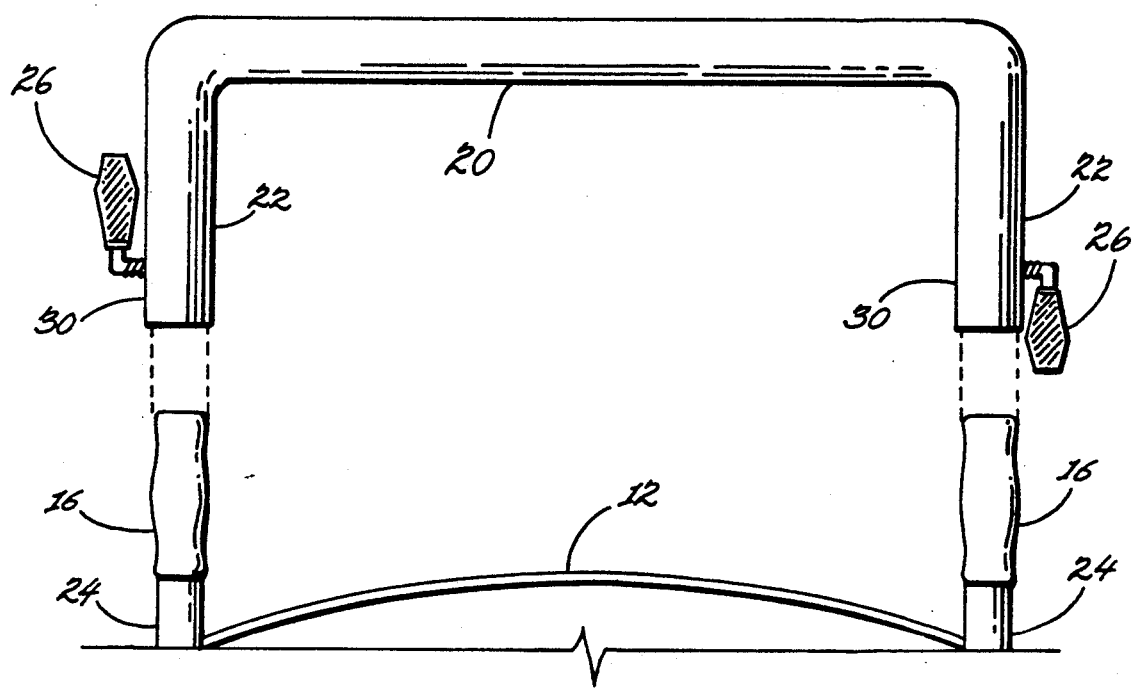
FIG. 2 is a view of a top elevation of the invention of FIG. 1.

The drawings show a combination wheelchair and push bar apparatus 10 comprising a collapsible wheelchair 12 and a quick disconnect push bar 14 for centrally connecting a pair of handle grips 16 of said collapsible wheelchair. The quick disconnect push bar 14 is of elongated and substantially U-shaped configuration for in-line connection the pair of spaced-a-part handle grips 16 adapted to be grasped by a single hand of a user comprising a central tubular member 20, a pair of sleeves 22 for quick engagement and disengagement with said pair of handle grips and associated handle frames 24, of tubular construction, said sleeves being outwardly cantilevered at the opposite ends of said central tubular member in spaced-apart relationship for laterally connecting the handle grips 16 of the wheelchair, said sleeves having associated locking fasteners 26 providing a positive locking engagement with the handle grips 16 and handle frames 24. The sleeves 22 position the central tubular member 20 extending between and in orthogonical relationship with the pair of handle grips 16 with said sleeves terminating in hollow ends 28.

Figure 3:
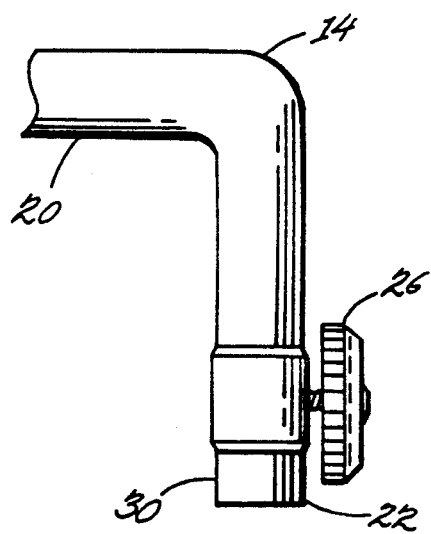
FIG. 3 is a fragmentary top elevational of the one end of the push bar of the invention showing the locking device.
Figure 4:
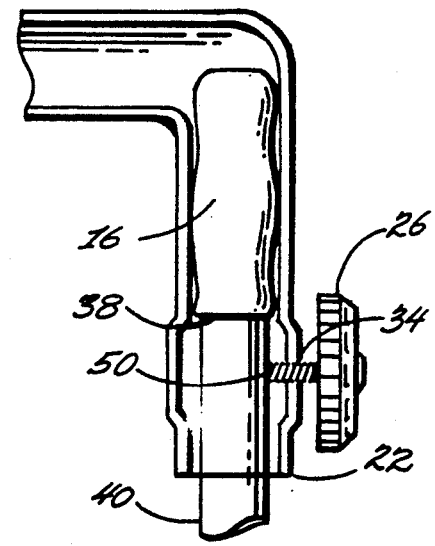
FIG. 4 is a cut-away view of the locking device as shown in FIG. 3.
Figure 5:
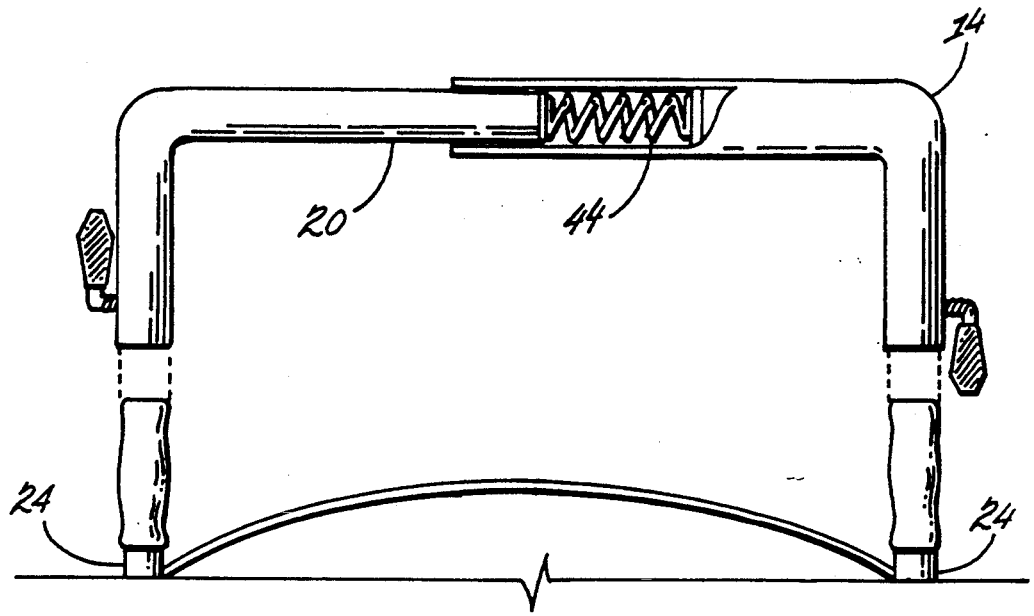
FIG. 5 is a top elevational view of an alternate embodiment of the invention, partially cut away to show an internal spring biasing extending device.
Figure 6:
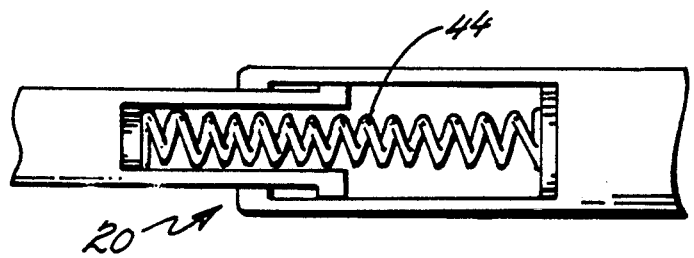
FIG. 6 is a partial view of the midsection of the push bar of FIG. 5, cut away to show the internal spring biased extending device.

In the preferred embodiment as shown in FIG. 1, the push bar apparatus 14 is composed of a tubular metallic material. As seen in FIGS. 3 and 4 the locking fastener 26 is located adjacent the open end 30 of an associated elongated hollow sleeve 22 and comprises a knob device 32 having a threaded shaft 34 extending in perpendicular relationship the longitudinal axis of said hollow sleeve 22 having a terminal end 36 adapted to compress the handle 24 between said end and the opposite wall of the hollow sleeve 22.

As seen in FIG. 4 each hollow sleeve 22 extends over an associated grip handle 16 to position the threaded shaft 34 immediately inwardly and adjacent the forward edge 38 of the handle grip extending in perpendicular relation ship to the longitudinal axis of said hollow sleeve. The pair of elongated hollow sleeves 22 are at opposite ends of the central tubular portion 20 for accepting an associated one of said handle grips 16 into and along the hollow interior 40 of each sleeve 22.

In order to accommodate conventional handle grips having a series of bumps for making gripping and holding easier, the elongated hollow sleeves 22 are characterized by a generally circular cross section of at least 1 and ⅜" having sufficient clearance to fit over and along a plurality of sizes of wheelchair grip handles, and are positioned to bias the pair of grip handles outwardly and away from each other.

Figure 7:
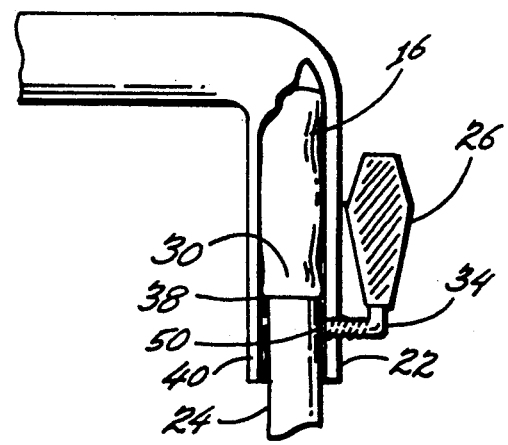
FIG. 7 is an enlarged view, partially cut away of one end of the invention of FIG. 5 alternate embodiment of the push bar device showing the sleeve extending over the handgrip with the fastening device engaging the handle frame.

In another embodiment, shown in FIG. 7 the push bar apparatus 14 includes sleeves 22 of elongated length so as to project forwardly over and beyond the end 36 of the rubber grip 16 securely attached to the handle frames 24 to permit the locking fastener 26 to engage the said tubular frame whereby the tip 50 of the locking fastener 26 abuts the forward edge 38 of the associated rubber grip 16 providing positive locking, and the central tubular member 20 includes a spring device 44 for providing longitudinal adjustment adapted to different special arrangements of grip handles of different wheelchairs.

What is claimed is:
1. A quick disconnect push bar apparatus adapted to centrally connecting handles of a collapsible wheel chair for application of propelling force and controlled steering comprising;
a) a collapsible wheelchair, foldable between an open user position and a folded transport position, comprising;
   i) a pair of side supports
   ii) handle frames connected to the side supports each handle frame having a distal end extending rearwardly from each side support positioned normally in spaced-apart relationship when in the open user position for controlling movement of said collapsible wheel chair;
   iii) handle grips mounted on said handle frames, each handle grip extending inwardly from said distal end to an forward edge and associated y secure attachment to each handle frame;
b) an elongated push bar, of substantially U-shaped configuration, for lateral, in-line connection of handle grips mounted on said handle frames attached to the wheelchair, adapted to be grasped by a single hand of a user comprising;
   i) a central tubular portion having an OD greater than 1 and ⅜" and having opposite ends;
   ii) sleeve means for quick engagement and disengagement with the pair of handle grips and associated handle frames, outwardly cantilevered at the opposite ends of said central tubular portion in spaced apart relationship for laterally connecting the hand grips of the wheelchair;
   iii) locking means providing a positive locking engagement with the handle grips attached to the handle frames for preventing accidental disengagement of the push bar apparatus from the wheelchair resulting in loss of control thereof;
   iv) said sleeve means configured to position the central tubular portion extending between and in orthogonal relationship with the pair of handle grips; and
   v) said sleeve means terminating in hollow ends.
2. A push bar apparatus for use in combination with a collapsible wheelchair comprising;
a) a collapsible wheelchair, foldable between an open user position and a folded transport position, comprising;
   i) a pair of side supports
   ii) handle frames connected to the side supports each handle frame having a distal end extending rearwardly from each side support positioned normally in spaced-apart relationship when in the open user position for controlling movement of said collapsible wheel chair;
   iii) handle grips mounted on said handle frames, each handle grip extending inwardly from said distal end to a forward edge and associated by secure attachment to each handle frame;
b) an elongated push bar for application of propelling force to said wheel chair and controlled steering, of substantially U-shaped configuration, adapted for lateral, in-line connection of the handle grips fastened to the handle frames, adapted to be grasped by a single hand of a user comprising;
   i) a central tubular portion having an OD greater than 1 and ⅜" terminating in a first end and a second end positioned at opposite ends of said tubular portion;
   ii) sleeve means for quick engagement and disengagement with the pair of handle grips and associated handle frames comprising a pair of hollow sleeves outwardly cantilevered from the first and second end of said central tubular portion in spaced-apart relationship for laterally connecting the handle grips attached to the handle frames of said wheelchair, each of said hollow sleeves terminating in a hollow end;
   iii) locking means providing a positive locking engagement with the handle grips attached to the associated handle frames for preventing accidental disengagement of the push bar apparatus from said wheelchair resulting in loss of control thereof; wherein said sleeve means is configured to position the central tubular portion between and in orthogonical relationship with the pair of handle grips fastened to the handle frames wherein said push bar controls the movement of said wheel chair to provide safety of an occupant and to hold said wheel chair in the open user position.

3. The push bar apparatus of claim 2 wherein said push bar is composed of a tubular metallic material.

4. The push bar apparatus of claim 2 wherein the locking means is located adjacent the hollow end of each hollow sleeve and comprises a knob device having a threaded shaft extending in perpendicular relationship tot he longitudinal axis of said sleeve means having a terminal end adapted to engage the handle frame adjacent the forward edge of each hand grip.

5. The push bar apparatus of claim 2 wherein each hollow sleeve extends over an associated handle grip to position the threaded shaft immediately inwardly and adjacent the forward edge of the handle grip extending in perpendicular relationship to the longitudinal axis of said hollow sleeve having a terminal end adapted to compress the handle frame between said end and the opposite wall of the hollow sleeve.

6. The push bar apparatus of claim 2 wherein said sleeve means comprise a pair of elongated hollow sleeves at opposite ends of the central tubular portion for accepting an associated one of said handle grips into and along the interior hollow sleeves.

7. The push bar apparatus of claim 2 wherein the elongated hollow sleeves are characterized by a generally circular cross-section and having an I.D. of at least 1 and ⅜" for extending over and along hand releasably engaging a plurality of sizes of wheelchair grip handles.

8. The push bar apparatus of claim 2 wherein said sleeve means normally bias the pair of grip handles outwardly away from each other.

9. The push bar apparatus of claim 2 wherein the sleeve means is of elongated length so as to project forwardly over and beyond the end of the rubber grip portion of the grip handles to permit the locking means to engage the tubular frame whereby the tip of the locking means abuts the forward edge of the associated rubber grip providing positive locking.

10. The push bar apparatus of claim 2 wherein the central tubular portion includes an adjustment device for providing longitudinal adjustment adapted to differing spatial arrangement of the grip handles of differing wheelchair construction.

11. The push bar apparatus of claim 6 wherein the wheelchair comprises a body portion, a large back wheel for propulsion and smaller front wheels for balance, said wheels being fastened to the body portion of the wheelchair, and the body portion also including side supports with a seat portion positioned between the side supports, and a back portion between upper supports, the body portion being foldable when the wheelchair is changed form a using position to a transporting position.

12. A method of controlling movement of a wheelchair responsive to the application of manual forces comprising the steps of;
 a) providing a collapsible wheel chair in a folded position;
 b) opening the wheel chair to an open position;
 c) providing a push bar apparatus for application of propelling force to said wheel chair, adapted to be grasped by a single hand of a user comprising;
  i) a central tubular portion terminating in a first hollow end and a second hollow end positioned at opposite ends of said tubular portion;
  ii) sleeve means for quick engagement and disengagement with handle grips of the wheel chair; and
  iii) locking means providing a positive locking engagement with the handle grips attached to the wheel chair for preventing accidental disengagement of the push bar apparatus from said wheelchair resulting in loss of control thereof; wherein said push bar controls the movement of said wheel chair to provide safety of an occupant;
 d) connecting the push bar apparatus with the wheel chair by sliding the sleeves over the handle grips; and
 e) locking the push bar apparatus over the handle grips with the locking means.

* * * * *